United States Patent Office 3,526,143
Patented Sept. 1, 1970

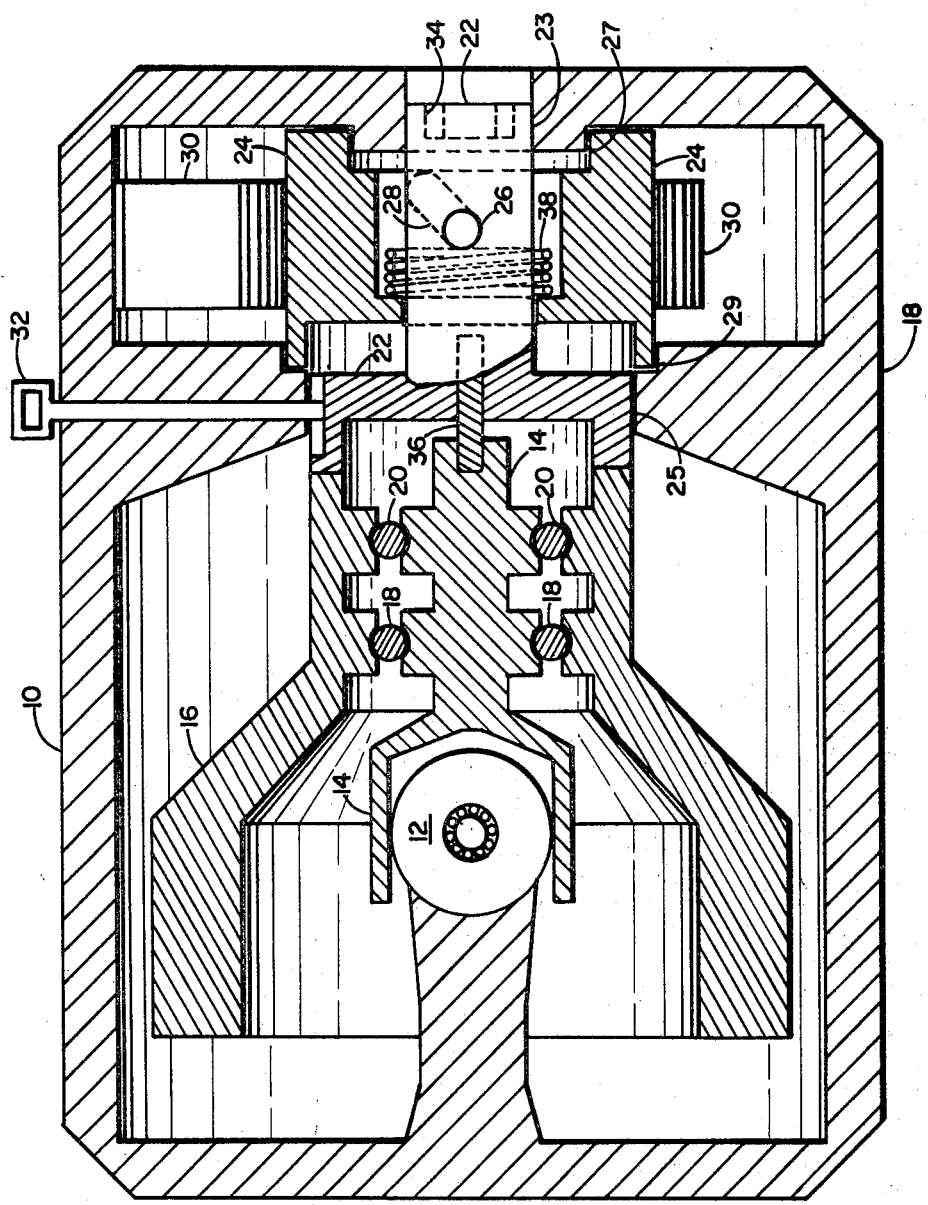

---

3,526,143
CONTROL APPARATUS
Julian Carl Henley, St. Petersburg, Fla., assignor to Honeywell Inc., Minneapolis, Minn., a corporation of Delaware
Filed Dec. 23, 1968, Ser. No. 786,206
Int. Cl. G01c 19/28
U.S. Cl. 74—5.1                                    1 Claim

ABSTRACT OF THE DISCLOSURE

A caging mechanism for a spring driven gyroscope in which a spin up driver remains engaged to the rotor until all of the spring energy is dissipated. A pin through the driver is held in inclined slots in a spring driven arbor by the torque of the drive spring. When the torque ceases, the pin rides out of the inclined slots and the driver is forced out of engagement with the rotor.

BACKGROUND OF THE INVENTION

In the prior art, many spring driven gyroscopes have been designed with various mechanisms to retract the driver out of engagement with the rotor after spinning the rotor up to speed. A common problem has been that the driver will disengage before all of the energy of the spring is expended. Prior art apparatus designed to sense when the torque of the spring has been expended so as to disengage the driver, has been complicated and costly. Also, prior art devices have often been prone to impart a nutation to the rotor due to a kick-off force imparted by the still wound spring as the driver leaves the rotor. The present invention avoids the above-mentioned difficulties with a minimum of parts and consequently a minimum cost and maximum reliability.

SUMMARY OF THE INVENTION

Briefly, the present invention comprises a rotor, a driver in frictional contact with the rotor, an arbor concentric with and surrounding the driver which is driven by a torsional spring, and a pin through the driver resting in inclined slots in the arbor. The spring is wound tight and held in place by a pawl which acts directly on the driver. The resultant relative torque between the driver and the arbor forces the pin to a position in the inclined slot where the driver rests firmly against the rotor of the gyroscope. When the pawl is released, this torque causes the arbor, pin, driver and rotor to spin up to speed until the torsional spring has expended its energy. With no energy left in the spring there is no more relative torque between the driver and the arbor and the pin rides to a new position in the inclined slot causing the driver to retract from engagement with the rotor. This disengaging motion is assisted by a second spring acting on the driver. Consequently, it is an object of the present invention to provide an improved gyroscope caging mechanism. A further object of my invention is to provide a caging mechanism with a minimum number of moving parts and a maximum reliability. Still another object is to provide a rugged caging mechanism in which the rotor and driver are supported by the housing so as to avoid unwanted nutational forces. Other objects and advantages will become apparent to those skilled in the art upon consideration of the following description and drawing.

BRIEF DESCRIPTION OF THE DRAWING

The drawing shows schematically a preferred embodiment of my invention. Most of the gyroscope is shown in section except for the right hand portion of the driver and the pin connecting the driver to the arbor.

DESCRIPTION OF THE PREFERRED EMBODIMENT

A housing 10 encloses the gyroscope and supports a two-axis gimbal assembly 12 which in turn supports a ball bearing race support 14 which is free to move about two orthogonal axes. A rotor 16 is positioned to spin about support 14 and is carried by a pair of ball bearing assemblies 18 and 20. Housing 10 supports a driver 22 at points 23 and 25. Driver 22 is shown in contact with rotor 16. An arbor 24 is also mounted on housing 10 at two points, 27 and 29. Arbor 24 is concentric about driver 22 and would be capable of independent rotation if it were not for a pin 26 which passes through driver 22 and engages arbor 24 by means of two inclined slots 28. Only one slot 28 is shown in the drawing. Arbor 24 is connected to a torsional spring 30. Rotation of driver 22 and arbor 24 is prevented by a pin 32 which engages driver 22 at its perimeter. A simple extraction pin is used in the drawing for the sake of clarity, however, in actual practice, pin 32 would most likely be replaced by a suitable remote control mechanism internal to housing 10.

OPERATION

Spring 30 is energized by inserting a suitable tool into hexagonal hole 34 and turning driver 22 clockwise. Pin 26 slides down slot 28 in arbor 24. This causes driver 22 to slide to the left against rotor 16. As driver 22 slides to the left a centering pin 36 engages support 14 so as to insure proper alignment. In addition, pin 26 compresses a spring 38. As pin 26 reaches the bottom of slot 28, arbor 24 and subsequently spring 30 are rotated and this process continues until torsional spring 30 is wound tight. At this point, pin 32 is inserted to stop driver 22 from rotating. The relative torque between driver 22 and arbor 24 keeps pin 26 at the bottom of slot 28 and, hence, driver 22 against rotor 16. To spin up rotor 16, pin 32 is extracted allowing driver 22, pin 26, arbor 24 and spring 30 to rotate. Driver 22 which already engages rotor 16 and causes rotor 16 to be spun up to speed. When torsional spring 30 has expended all of its energy, arbor 24 will slow down relative to driver 22. This will cause pin 26 to ride upwards in slot 28 which forces driver 22 to retract and disengage from rotor 16. This retraction motion is assisted by spring 38. After driver 22 has fully disengaged rotor 16 centering pin 36 retracts allowing rotor 16 free movement in two axes. It is evident that the design of my invention allows all of the energy of the spring 30 to be used in turning rotor 16. Since no energy is wasted the spring may be made smaller and more compact. It should be further noted that both ends of driver 22 and arbor 24 are supported by housing 10 so that they are stable floating elements referenced precisely by bearing surfaces at each end, and, thus, not affected by transverse forces generated by the spring. Consequently, only rotational torques are imparted to rotor 16 so that rotor 16 is always properly aligned.

Those skilled in the art will recognize that various modifications may be made to the apparatus disclosed without departing from the spirit and scope of the invention. Consequently, I do not intend the present invention to be limited to the particular embodiment and apparatus shown in the drawing except as defined by the appended claim.

I claim:
1. A gyroscope comprising:
a housing;
a rotor with a spin axis, mounted within the housing for rotation about the spin axis;
a spring loaded driver means mounted within the housing for rotation about and translation along the spin axis, including a connecting pin mounted transversely to the spin axis;

an arbor mounted within the housing and concentric with the driver for rotation about the spin axis, the connecting pin riding in a diagonal slot means formed in the arbor;

a spring mounted within the arbor;

means for preventing rotation of the driver until the gyroscope is to be actuated; and, means for winding the spring which then exerts a torque on the arbor that is transferred to the driver by the coaction of the connecting pin and slot means, causing the driver to translate and make frictional contact with the rotor and rotate when the gyroscope is actuated.

References Cited

UNITED STATES PATENTS

| 3,247,726 | 4/1966 | East et al. | 74—5.12 |
| 3,263,508 | 8/1966 | Voge et al. | 74—5.12 |
| 3,270,568 | 9/1966 | Moravek et al. | 74—5.12 |
| 3,299,718 | 1/1967 | East | 74—5.12 |
| 3,434,355 | 3/1969 | Brastow et al. | 74—5.12 |

FOREIGN PATENTS

| 211,412 | 1/1957 | Australia. |

MANUEL A. ANTONAKAS, Primary Examiner

U.S. Cl. X.R.

74—5.7